United States Patent [19]
Hong

[11] Patent Number: 5,846,627
[45] Date of Patent: *Dec. 8, 1998

[54] METHOD FOR WRITING AND READING DATA ON A MULTI-LAYER RECORDABLE INTERFEROMETRIC OPTICAL DISC AND METHOD FOR FABRICATING SUCH

[76] Inventor: Gilbert H. Hong, 12820 Alta Tierra, Los Altos Hills, Calif. 94022

[ * ] Notice: The term of this patent shall not extend beyond the expiration date of Pat. No. 5,688,447.

[21] Appl. No.: 870,471

[22] Filed: Jun. 6, 1997

Related U.S. Application Data

[62] Division of Ser. No. 593,694, Jan. 29, 1996, Pat. No. 5,669,995.
[51] Int. Cl.$^6$ ........................................... B32B 3/00
[52] U.S. Cl. .................. 428/64.1; 428/64.4; 428/64.7; 428/64.8; 428/913; 430/270.14; 430/495.1; 430/945; 369/275.1; 369/283; 369/288
[58] Field of Search .................. 428/64.1, 64.2, 428/64.4, 64.7, 64.8, 457, 913; 430/270.14, 495.1, 945; 369/275.1, 275.4, 283, 288

[56] References Cited

U.S. PATENT DOCUMENTS 5,688,447  11/1997  Hong ...................................... 264/1.33

Primary Examiner—Elizabeth Evans
Attorney, Agent, or Firm—Thomas E. Schatzel; Laws Offices of Thomas E. Schatzel A Prof. Corporation

[57] ABSTRACT

A recordable compact disc comprises a 0.6 millimeter clear plastic or glass substrate on which is grown a thin-film image layer having several distinct recording planes. Each recording plane is separated from the next by a clear plastic layer. Each recording plane includes an organic dye layer in combination with another clear layer that has a different index of refraction. Different color dyes are used for each recording plane.

A method for storing and reading data to and from a multilayer recordable compact disc with different color dye layers uses high powered color lasers to write each recording plane and low powered monochromatic reading lasers that are sensitive to the constructive and destructive light interference effects caused by micron variations in the clear plastic layers in each recording plane. The micron variations used for each recording plane are unique and chosen along with the monochromatic reading laser colors to have minimal crosstalk between recording-plane data channels.

10 Claims, 9 Drawing Sheets

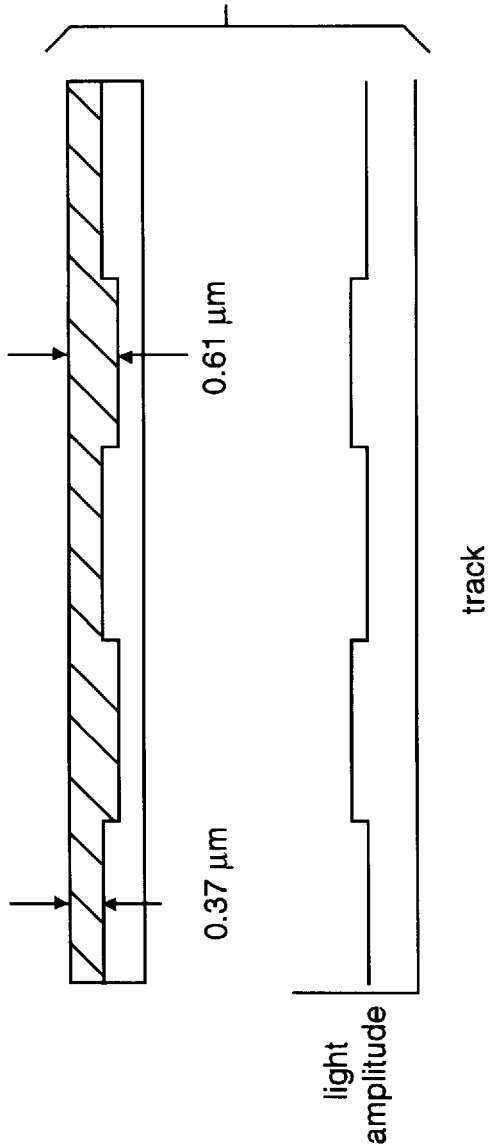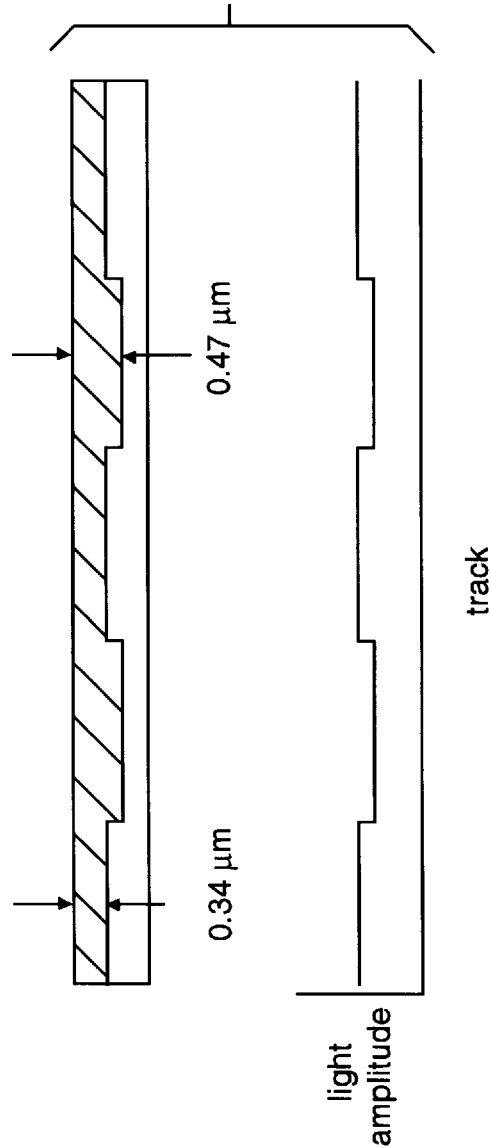

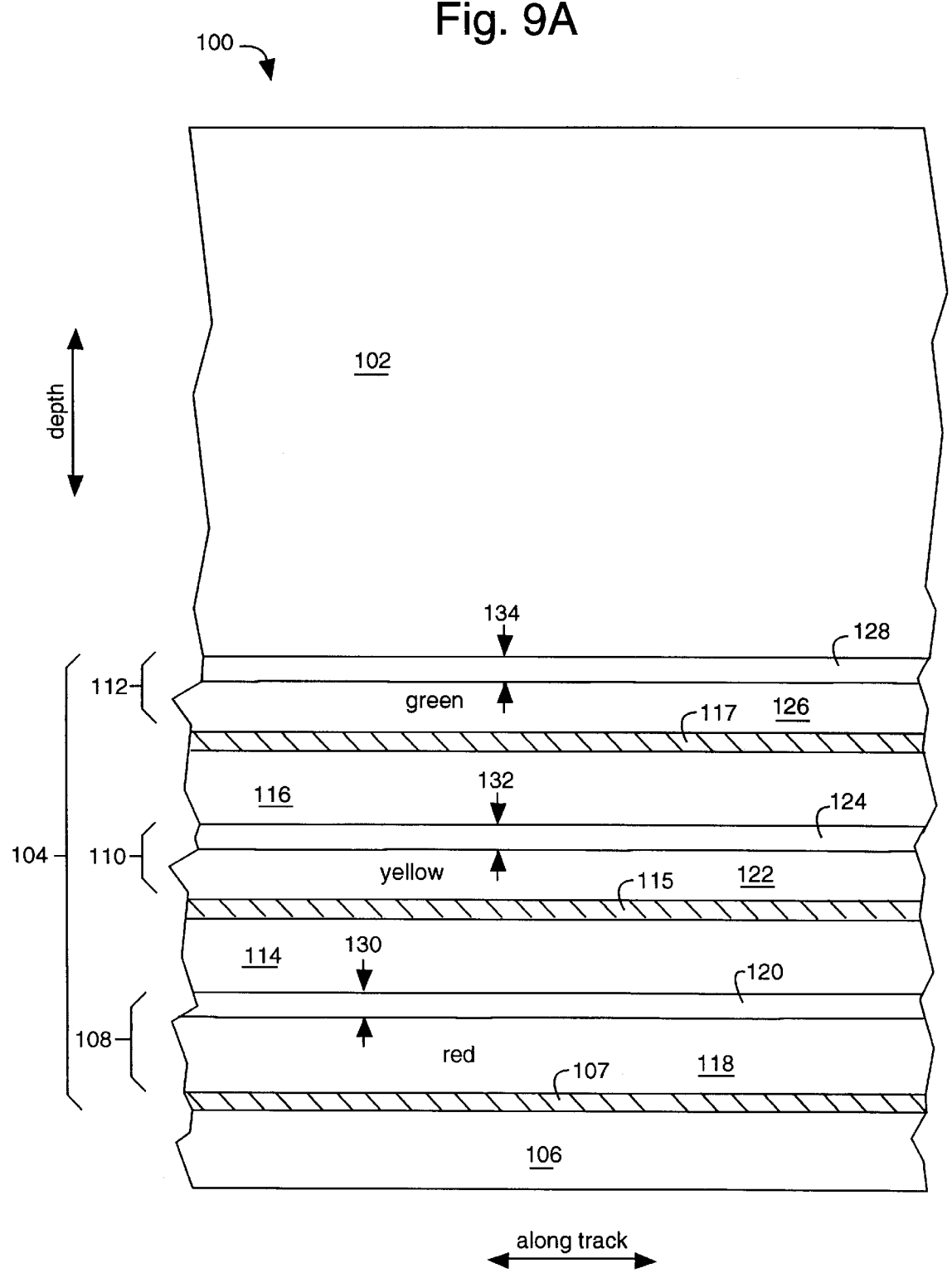

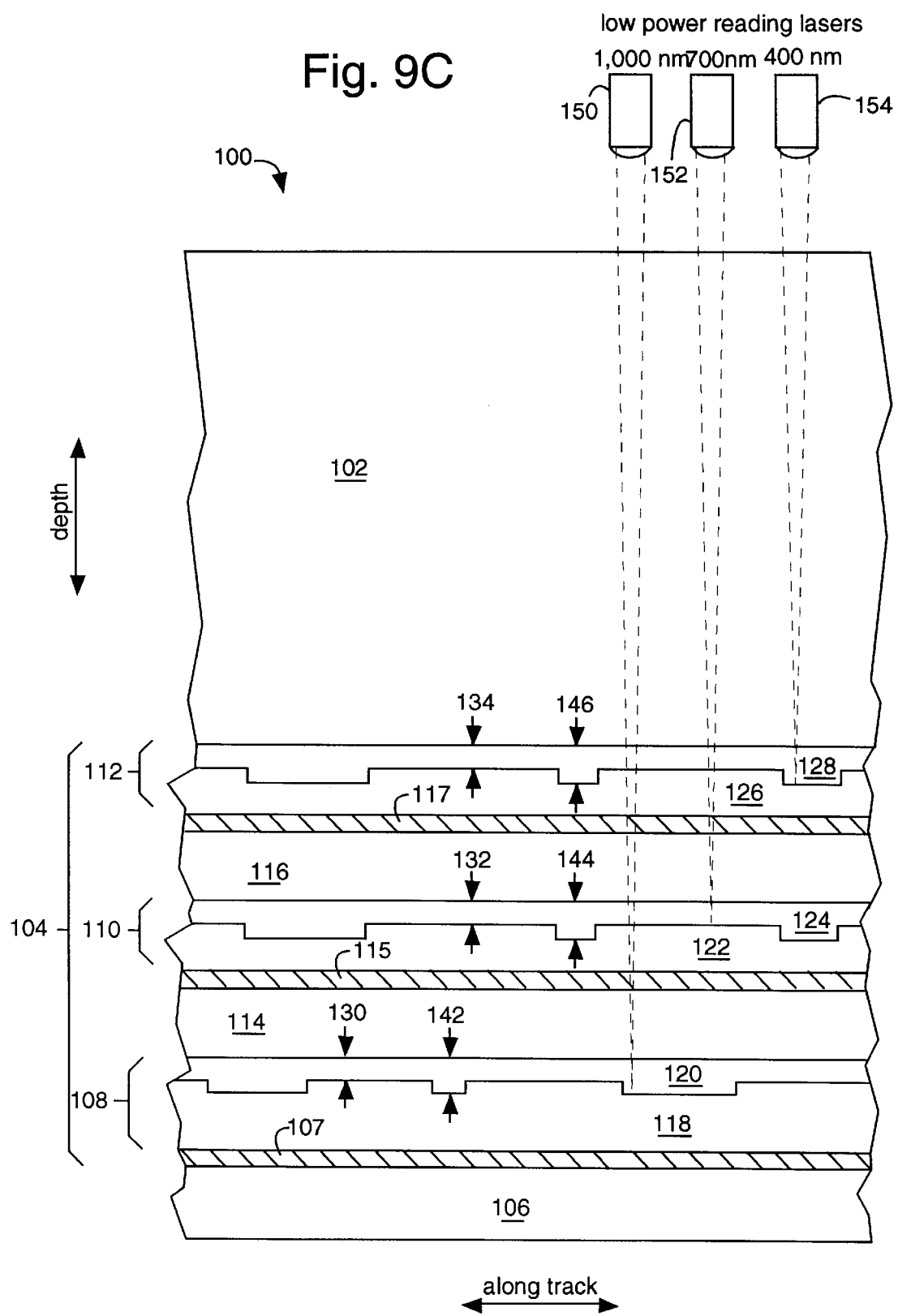

METHOD FOR WRITING AND READING DATA ON A MULTI-LAYER RECORDABLE INTERFEROMETRIC OPTICAL DISC AND METHOD FOR FABRICATING SUCH

This is a divisional of application Ser. No. 08/593,694 filed on Jan. 29, 1996 now U.S. Pat. No. 5,669,995 issued Sep. 23, 1997.

RELATED APPLICATIONS

Copending U.S. patent application Ser. No. 08/207,878, filed Mar. 8, 1994, now U.S. Pat. No. 5,468,324 issued Nov. 21, 1995, is incorporated herein by reference.

BACKGROUND OF THE INVENTION

1. Field of the Invention

The present invention relates to optical recordable compact discs and more particularly to multilayer recordable compact discs that provide very high data storage capacities and methods for fabricating recordable compact discs with multiple recording layers.

2. Description of the Prior Art

Compact discs read only memory (CD-ROM) discs and drives are now ubiquitous in computer data storage, audio recording of musical artists and video. Given the universal demand for CD-ROM titles, the manufacturing of CD-ROM duplicates from masters have assumed very large volumes.

CD-ROM manufacturing is concerned both with duplication fidelity and manufacturing cost. The manufacturing processes used in CD-ROM production closely resemble those used in the fabrication of semiconductors, especially the methods used in mask making.

Mastering, as its name implies, is the process of creating the disc from which all others are produced. The first step in the manufacturing process is to create a master that can be used for replication. A laser can be used to burn pits and lands containing the data into a photoresist surface beginning at the center track and moving outward in a spiral pattern.

After checking a glass master for accuracy, conventional replication machinery makes a stamper. Different replication processes require slightly different stampers, but the function remains the same, embossing the data pattern on the mass-production disc. Through an injection molding process, a series of intermediate impressions are made that provide a generation of negative stampers that produce positive disc images. The family-tree-like structure of this part of the production cycle has given rise to names such as mother, father and sons or daughters for the various disc generations.

Compact discs (CDs) are typically made from a polycarbonate plastic, which is a material that is less vulnerable to water absorption and heat than polymethylmethacrylate (PMMA), which is universally used in laminated videodiscs. Videodiscs comprise two slices of substrate sandwiched together, so they are more rigid than CDs. Manufacturers take precautions to prevent heat or water-absorption warping, e.g., by using some type of injection molding in which polycarbonate resin is heated and poured into molds that shape the discs. A stamper impresses data patterns into the cooling plastic, and the disc is then put in a vacuum chamber, where a reflective layer of aluminum is added and coated with a protective lacquer. Labels are silk-screened or printed on the lacquer side.

Injection molding has a number of advantages. Plants worldwide use the technique, and its idiosyncrasies are well known. Yields are typically low when a manufacturing plant first opens, and increase substantially as experience is gained. Injection molding's critics claim the process is messy and requires large capital investments in equipment and clean rooms. During molding, polycarbonate distortions can appear in the plastic that impair or deflect a laser reading light. Despite its shortcomings, a number of manufacturing plants operating today use this process.

Minnesota Mining and Manufacturing Company (3M), for example, uses a prior art photo-polymerization (2P) process in which precut polycarbonate precursor resin is inserted between a master and a base plate, and then embossed. This polycarbonate precursor sandwich filling is then cured with ultraviolet light. This replication method has the advantage of being quick, which comes partially by avoiding any heating or cooling of the plastic during production. Critics of this process say yields remain low because improper curing or warpage causes many discs to be rejected.

DOCData of Venlo, The Netherlands, and COMDisc of Los Angeles use two quite different methods that attempt to produce fast, low-cost replication of compact discs by a continuous printing or embossing technique. Both systems have worked in a laboratory setting, but neither is currently available commercially. Although the techniques show promise and have attracted a great deal of attention, no major company has yet committed itself financially to either process.

Masters are original copies of data recordings that are produced from tapes or software provided by artists and programmers. Lasers and electron beams (E-beams) are used as exposure tools for a photoresist carried on glass and photoplates. Semiconductor photomasks are similarly prepared.

Stampers are sub-masters duplicated from masters. Electroplating and photopolymers are two common ways that gaps in resist images are filled to produce reverse-tone sub-master duplicates of the masters so that the ultimate copies manufactured are positives of the masters.

The prior art photo-polymerization (2P) process starts with monomers that are irradiated to form polymers. In data recording disc duplication, such a process requires expensive machinery for ultraviolet irradiation and pressurizing the monomer solutions.

The copending United States Patent Application incorporated herein describes spin coating as a useful technique for reproducing microstructures as small as 0.4 microns and as shallow as 0.1 microns. In a spin-on-and-peel process, a polymer solution is prepared with solvents and purified by filtering. The polymer is first spin-coated onto a master that is to be duplicated. Next, venting and drying of the polymer provides for an exact, but negative replica of the master to be formed as a thin film on the master. The thin-film replica is cured, and then separated by simply peeling it off from the master. Such method is useful for making plastic stampers of plastic to create standard-density CD's, e.g., that store 600 MB. The spin-on-and-peel technique is also suitable for high-density CD manufacturing.

In conventional injection molding, hot molten plastic is injected under high pressure into a containment cavity. Inside the cavity, a template with images in relief, the stamper is used as a master to transfer its physical image features to the injected plastic. After time, the hot molten plastic cools and hardens to form a solid plastic platter. The features that are copied this way can represent video, audio and/or computer data.

Photo-polymerization is used to make copies in plastic without using added heat. Instead of using hot molten plastic, a liquid photo-sensitive monomer is injected into the cavity containing the plastic stamper. Ultra-violet radiation is used to cure the monomer while in intimate contact with the stamper, the UV radiation solidifies the liquid monomer into a solid to form the plastic platter.

High-density CDs are needed to accommodate the ever-increasing data storage requirements of users. In high-resolution video, the data storage needs demand huge capacities. For a full length movie, a gigabyte or more of memory storage capacity is needed. The design and manufacturing of high-density CDs adequate for such use is presently restricted by the shortcomings of conventional technology which uses standard sixty-ton pressure injection molding and stampers made of nickel. Since high temperatures are used to liquefy the plastic, the stacking of additional image layers over the first image is impossible using hot plastic because the under layers would remelt. However, an important high-density CD construction technique that uses multiple image layers of pits and lands promises a solution to very high storage density needs. At a minimum, injection molding alone is not a practical way to manufacture high-density CDs.

Various industry consortiums have been formed to cooperate on the development and marketing of high-density CDs. Time, Warner and Toshiba have proposed an alternative two-layer CD structure that can be fabricated by injection molding side "A" then side "B" separately (0.6 mm thick half height) and then joining the two sides back-to-back with aluminum reflective layers in a lamination which yields a 1.2 mm overall thickness. The back-to-back lamination and aluminum reflective layers in between keeps the data images away from the surfaces and thus protects the information from contamination. The two-sided CD is readable with a conventional one-sided CD player, but the diode lasers must be configured to have an unconventional focus length of 0.6 mm, instead of the usual 1.2 mm length. Also it can be read only one side at a time. The second side is accessed by flipping the CD over, as is done with popular vinyl LP records and tape cassettes. Of course, two readers can be combined, one at top and one at bottom, but the equipment would cost more. The method of laminating parts together cannot be used to construct three-layer CDs, because if the over-all thickness is too great, it becomes impossible for the diode laser head to read the deeper layers. Thus to keep the overall thickness within reasonable bounds, multiple layers of thin films would have to be used to make it possible to access the deepest layers. Thin layers are practically impossible to make with injection molding techniques, because it becomes too difficult to maintain a uniform spacing in the cavity and to control warping and shrinkage.

Another CD design consortium, between Sony and Philips, specifies only one reader head on a side, similar to present convention, and uses the standard CD thickness of 1.2 mm. Multiple layers are used that are staged at intervals of thirty to forty microns. All the data is accessed from only one side, so the overlying layers must be transparent, or at least translucent. The 3M Corporation has developed a method to manufacture CDs that conforms to the Sony-Philips specification. A photo-polymerization process is used. For example, a layer "A" of a CD is made using standard injection molding techniques. A layer "B" is added to the first layer with a second stamper at the bottom and the first layer at the top with a photo-polymerization monomer layer in between. High pressure is used to force relatively cool liquid monomer into the void between the first layer and the stamper. The pressure is necessary to achieve the intimate material conformance necessary to duplicate the image on the stamper. The injected-in monomer is cured with ultra-violet light, for example, by directing from the top side through the layer "A" plastic. The stamper is conventionally separated from the new CD and sent on for final labeling and printing. The photo-polymerization process introduced the use of monomers and ultra-violet light to cure them, instead of using heating and cooling, as in standard injection molding. Such method is better because more layers can be built-up simply by repeating the same process over and over. Overall thickness can easily be controlled, because each photo-polymerization layer can be a minimum of forty microns thick.

The main advantage of the photo-polymerization process is its usefulness in depositing additional layers of plastics on existing layers of plastics, without disturbing the underlying layers' embedded data. But such photo-polymerization process is still an injection method, high pressure is still needed and the making of uniform films' precise thickness is difficult. The photo-polymerization process depends on too many variables to control the thickness of each layer very well. Complicated thickness measurement devices could be used to guarantee the desired thirty micron gaps for photo-polymerization material, but that would complicate the process and make the products more expensive.

A CD-compatible, write-once disc with high reflectivity is described by E. Hamada, et al., in an article by the same name published in SPIE, volume 1078, Optical Data Storage Meeting (1989), pp. 80–87. A photo-absorption layer includes organic dye material that decomposes under exposure to a recording laser and causes a substrate resin to expand and intrude. But such a disc offers no greater data storage capacity than other CD's.

What is needed is a multilayer recordable compact disc and a method for making such a structure.

SUMMARY OF THE PRESENT INVENTION

It is therefore an object of the present invention to provide a high-density recordable optical disc.

It is a further object of the present invention to provide a mass-production method for making multi-layer high-density optical disc blanks for recording by end users.

Briefly, a recordable compact disc embodiment of the present invention comprises a 0.6 millimeter clear plastic substrate on which is grown a thin-film image layer having several distinct recording planes. Each recording plane is separated from the next by a clear plastic layer. Each recording plane includes an organic dye layer in combination with a clear polycarbonate layer that has a different index of refraction. Different primary color dyes are used for each recording plane.

A method embodiment of the present invention for storing and reading data to and from a multilayer recordable compact disc with different color dye layers uses high powered color lasers to write each recording plane and low powered monochromatic reading lasers that are sensitive to the constructive and destructive light interference effects caused by submicron variations in the clear polycarbonate layers in each recording plane. The submicron variations used for each recording plane are unique and chosen along with the monochromatic reading laser colors to have minimal crosstalk between recording-plane data channels.

An embodiment of the present invention for mass-producing two-layer recordable optical discs comprises molding a substrate and a first recordable layer by an injection process in which a heated plastic is injected under pressure to press in intimate contact with a first stamper having a physical relief pattern which represents pre-recording grooves. Then the polymer substrate is separated from the first stamper. A layer of photochemically decomposible dye is added. A partially reflective layer is deposited over the dye layer to complete the first recordable layer. A second polymer solution or UV curable monomer liquid is deposited over the second stamper with pre-recording grooves and the second stamper is spinned. A clear film is formed after curing and separated from the second stamper. The polymer film is then laminated to the partially reflective layer and the substrate and first recordable layer with grooved structure exposed. Another dye layer is deposited over the pre-recording grooves and another reflective layer is added over the dye layer to complete the second recordable layer. The pre-grooved structure is needed to guide the writing laser for focusing purpose. All recordable layers must have pregrooves to facilitate laser writing. Further processing steps might involve adding a protective layer over the reflective layer and printing or labeling, similar to current single layer CD-R manufacturing.

An advantage of the present invention is that a process is provided that allows several layers to be simply and accurately fabricated in a high-density CD.

Another advantage of the present invention is that thin-film media with multiple layers, multiple channels, and multiple detectors can be accurately fabricated at low costs.

Another advantage of the present invention is that it provides a process that requires no high pressures that can warp the image layers or cause non-uniform layer thickness to develop.

An advantage of the present invention is that a high-density recordable optical disc is provided.

A further advantage of the present invention is that a method is provided for making high-density recordable optical discs.

These and other objects and advantages of the present invention will no doubt become obvious to those of ordinary skill in the art after having read the following detailed description of the preferred embodiments which are illustrated in the various drawing figures.

IN THE DRAWINGS

FIG. 7 is a cross-sectional diagram of a resonancecavity compact disc for 400 nanometers lasers;

FIG. 8 is a cross-sectional diagram of a resonancecavity compact disc for 700 nanometers lasers;

Figure 9B:
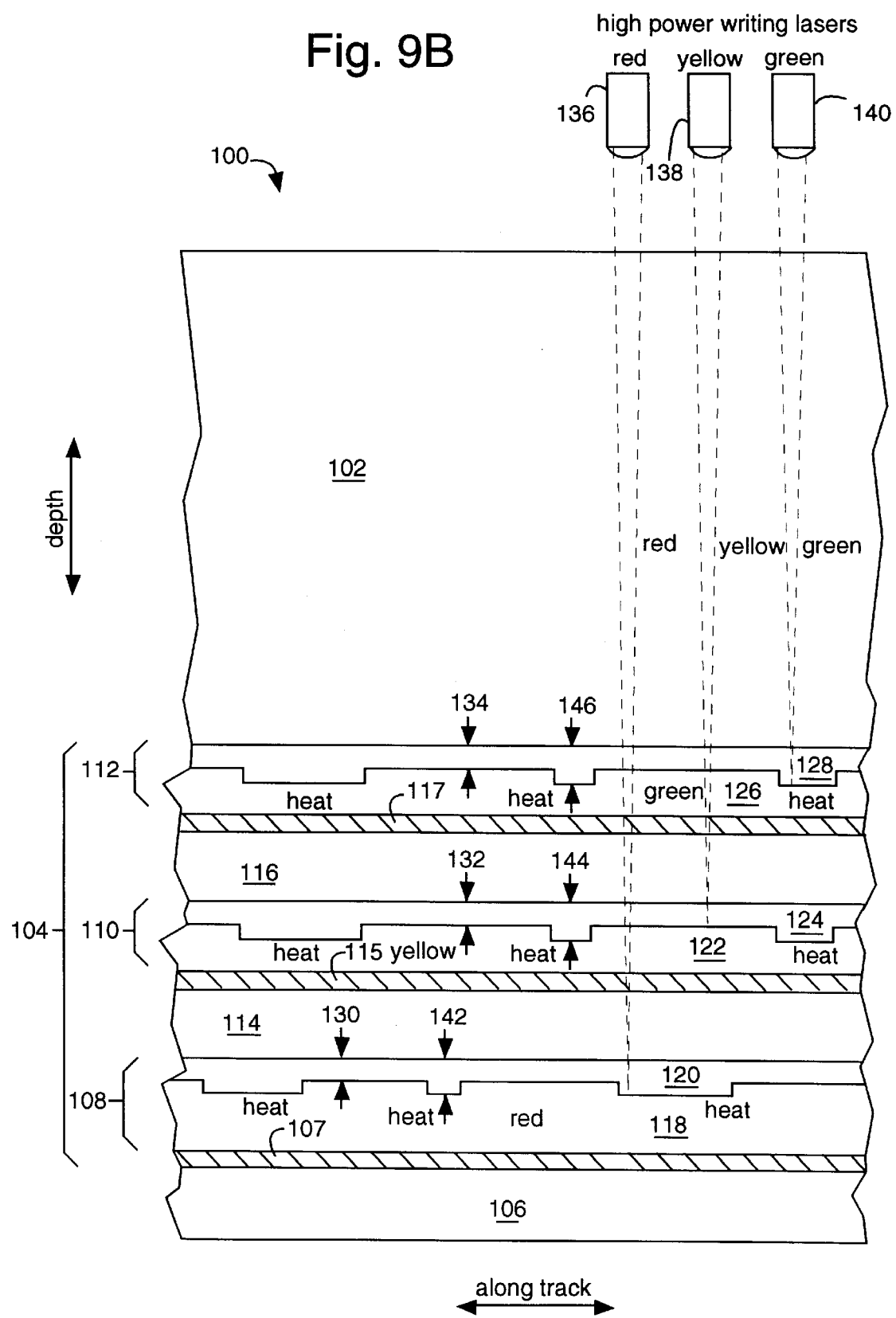

FIGS. 9A–9C illustrate a method of the present invention for writing and reading data to and from a multilayer recordable optical disc. The method is shown by the change in states of a three-layer recordable compact disc. FIG. 9A shows the recordable compact disc as a blank disc. FIG. 9B shows the recordable compact disc being written with data. FIG. 9C shows the data being read back from the recordable compact disc; and FIGS. 10–10B illustrates writing and reading strategies for multiple-layered recordable optical memory.

DETAILED DESCRIPTION OF THE PREFERRED EMBODIMENTS

Figure 1:
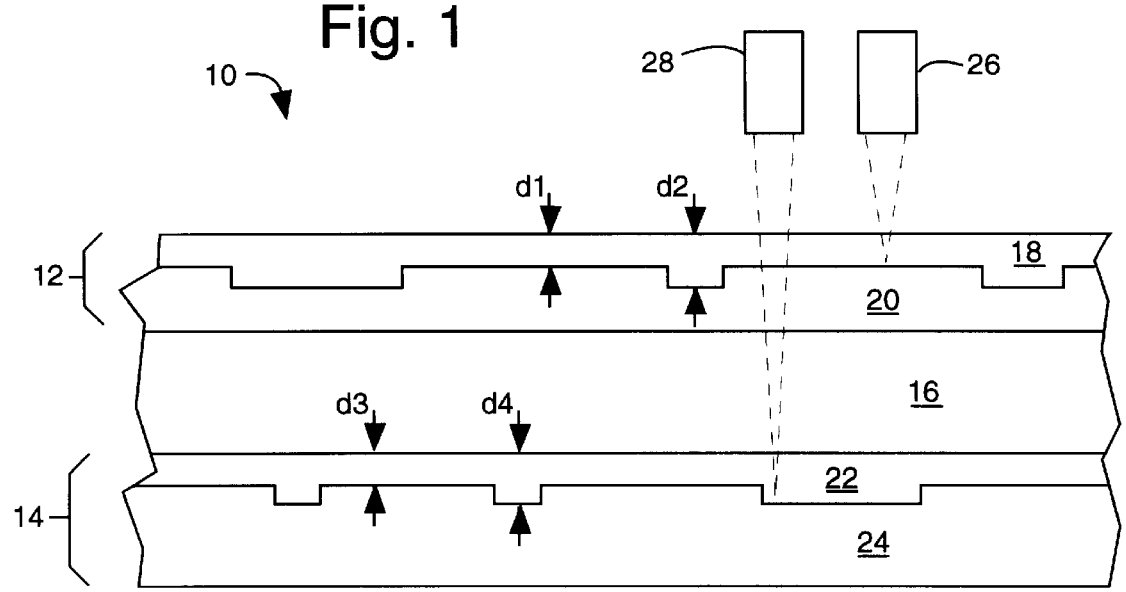
FIG. 1 is a cross-sectional diagram of a first optical disc embodiment of the present invention.

FIG. 1 illustrates an optical disc embodiment of the present invention, referred to herein by the general reference numeral 10. The optical disc 10 is similar to the compact disc (CD) that is highly recognized by the lay population. Digital data is recorded in one or more image layers of the optical disc 10. For example, in the two-layer version of optical disc 10 shown, a first image layer 12 is laminated to a second image layer 14 with a transparent adhesive layer 16 in between. The first image layer 12 comprises a transparent material 18 that contain two thickness from a smaller "d1" to a larger "d2". The physical difference between "d1" and "d2" presents the opportunity for digital bits of data to be represented by physical relief in the first image layer 12. A partially-reflective material 20 allows light to penetrate deeper into the optical disc 10 and into the layers 16 and 14. The second image layer 14 comprises a transparent material 22 that contains two thickness a smaller "d3" and a larger "d4". The physical difference between "d3" and "d4" presents another opportunity for digital bits of data to be represented by physical relief in the second image layer 14. A reflective layer 24 completes the second image layer 14.

Standard compact disc specifications for "d1" and "d2" are about 1.2 mm, and layer 14 and detector 28 are absent. Layer 20 is total reflective aluminum and 16 is the protective and labeling layers. In this case, injection molding is appropriate because "d1" and "d2" are relatively thick.

The equivalent Sony and Philips compact disc specifications for "d1" and "d2" are about 1.2 mm, and layer 20 is a partially reflective layer. Layer 16 can be considered as a spacer layer that separates layer 12 from 14 by thirty micrometers. Laser diode and detector 28 is absent but laser diode and detector 26 can be made to have adjustable focal length and be capable of reading either layer 12 or 14 at will by simply changing the focus. Layer 12 can be made with injection molding but layer 14 is properly made with spin and peel (SOAP) and/or photo-polymerization (2P). In this case, layer 22 can be considered as the thin film layer and layer 24 the final totally reflective aluminum layer. Additional protective and labeling layers are added beyond layer 24.

The equivalent Time-Warner-Toshiba compact disc specifications for both "d1" and "d2" are around 0.6 mm. Layer 24 is around 0.6 mm also. Layers 20 and 22 are both totally reflective and therefore data on them can only be read one side at a time. Layer 16 is the laminating glue. Laser diode and detector 28 is absent and laser diode and detector 26 must be re-configured to have a focal length at 0.6 mm. There is no labeling allowed in the data area. All labeling is done in the central ring area, similar to LP records.

The present invention is based on the ability to accurately fabricate thin film between zero to tens of micrometers with relief images via spin-on-and-peel method. This allows for the possibility of all plastic thin-film optical storage media where refractive indices variation is utilized to induce reflections. This refers to the situation that layer 20 comprises transparent plastic materials. The only requirement is that the refractive index must be substantially different from that of layer 18. Similarly, the refractive index for layer 24 must be different from that of layer 22. It is the refractive index differentials that induce different laser intensities at "d1" and "d2" and similarly at "d3" and "d4". These are important because in the multiple layer structure, partial reflection can be accomplished in this manner without reflective metal coatings. This allows for the building of more layers.

The fabrication of thin film also allows for an all plastic thin-film optical storage media in the multiple layer structure, with one single detector having an adjustable focal length to read one layer at a time. This refers to the situation where detector 28 can be eliminated and layer 16 is thirty microns or larger. Because of the relatively small depths of focus in most laser optics, layer 14 will be out of focus while detector 26 is focused on layer 12 and vice versa. Again the thin film concept allows adequate separations between layers that is impossible to achieve by any other methods.

Thin film also allows for all plastic thin film optical storage media where interferometric effect is utilized to induce constructive and destructive effects of laser wavefronts in the media with accurate prescribed thickness. In this scheme, multiple detectors with multiple color are used. All layers can be addressed simultaneously. This represents a more sophisticated design. Thickness "d1", "d2", "d3" and "d4" are optimized for specific colors of laser diode in detectors 26 and 28, layer 16 can be basically eliminated, and detectors 26 and 28 do not differ in focal length but differ in color. Layers 18 and 22 can be the same material and layers 20 and 24 can be of the same material. However, layers 18 and 20 will have different refractive indices.

Conventional CDs use one image layer and depend on a system of pits and lands to scatter or reflect light. The intensity of the reflected light is thus affected by the degree to which a laser light is reflected back. The amplitude of the reflected light thus can carry amplitude modulated digital data.

The present invention differs in that the thickness "d1" through "d4" are exceedingly small, and are on the order of the color of light. Light interferometry phenomenon is used to dictate the color of a first laser diode and detector 26 and the size of "d1" and "d2". Similarly, such etalon effect is used to select the color of operation for a second laser diode and detector 28 and the size of "d3" and "d4". Advantage may also be taken of the fact that the focal length of laser diode and detector 28 to layer 14 is very different than that of laser diode and detector 26 to layer 12. For example, the focal length of the former may be 1.2 mm, while the focal length of the second may be thirty microns larger. To take advantage of such focal length differences, the laser diode and detectors 26 and 28 are fitted with appropriate optics, e.g., lenses, using conventional techniques and materials.

Because the relative phases of light reflected from the near and far sides of the transparent layers 18 and 22 can add or subtract from one another, the intensity of the composite reflections can vary significantly. Where the first laser diode and detector 26 is selected to operate at a color of 400 nanometers, the intensity of light reflected from the first image layer 12 will be minimum, e.g., where the transparent layer 18 is 0.37 microns thick. The intensity of light reflected from the first image layer 12 will be maximum, e.g., where the transparent layer 18 is 0.61 microns thick. Thus the contrast of reflected light intensity will be best if "d1" is set to equal a minimum and "d2" is set to equal a maximum, or vice versa. (This is shown in FIG. 7.)

Similarly, where the second laser diode and detector 28 is selected to operate at a color of 700 nanometers, the intensity of light reflected from the second image layer 14 will be minimum, e.g., where the transparent layer 22 is 0.47 microns thick. The intensity of light reflected from the second image layer 14 will be maximum, e.g., where the transparent layer 22 is 0.34 microns thick. Thus the contrast of reflected light intensity will be best if "d3" is set to equal a minimum and "d4" is set to equal a maximum, or vice versa. (This is shown in FIG. 8.)

The two different colors of operation of the laser diode and detectors 26 and 28 thus permits simultaneous data access of the multiple data channels without cross-channel interference. In alternative embodiments of the present invention, more than two image layers and different color laser diode and detectors are used to obtain three or more overlying channels.

Conventional mass production CD fabrication techniques may not be up to the challenge of forming sub-micron features in plastics, or up to the challenge of fabricating two or more such image layers in an optical disc, such as a video CD or computer CD-ROM.

While the inventions here refer to both layers 12 and 14 as thin-film storage devices, at least one image layer can be of the conventional thick-film type (1.2 mm) to provide the physical rigidity of the discs. The illustration that follows assumes that layer 12 is of the thick type and layer 14 is of the thin type.

Figure 2:
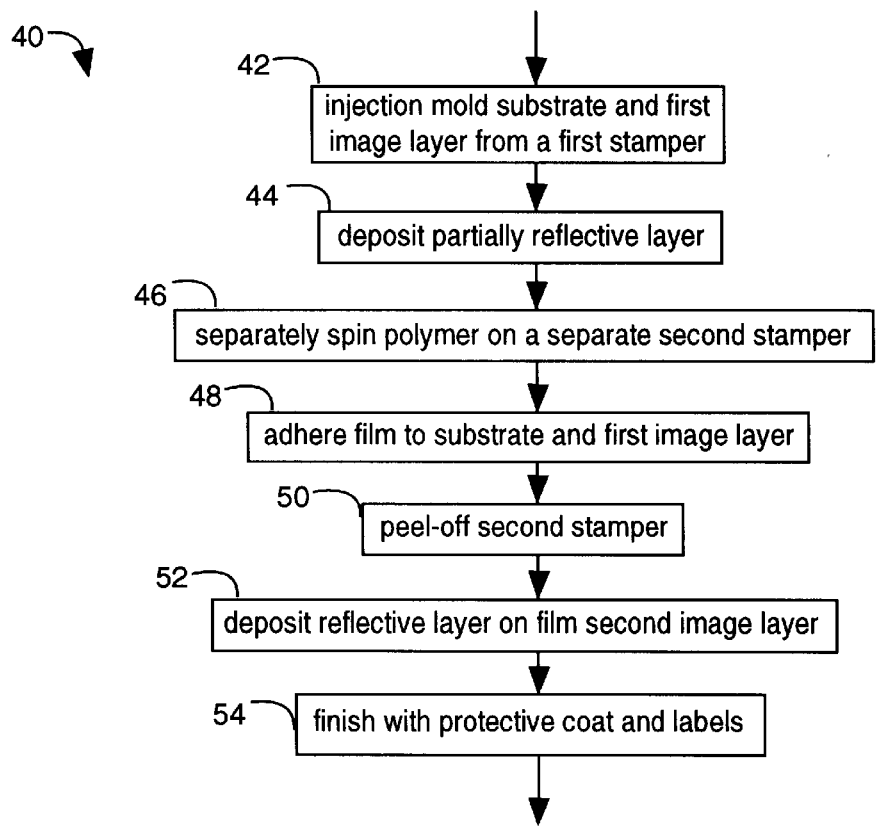
FIG. 2 is a flowchart of a first method embodiment of the present invention for making the optical disc of FIG. 1.

FIG. 2 illustrates a method embodiment of the present invention, referred to by the general reference numeral 40. The method 40 includes a step 42 for making the first image layer and substrate, e.g., layer 18, by the conventional process of injecting a hot molten plastic into a containment cavity with a plastic stamper made of metal. Such stamper has features in relief that are patterned in plan view to represent data for the first image layer 12. Such features in relief rise a height equal to d2–d1. In a step 44, a partially-reflective layer of material, e.g., layer 20 comprising aluminum, is sputtered onto layer 18 using conventional techniques. In a step 46, a polymer film is separately spun on to a separate second stamper that has features in relief that are patterned in plan view to represent data for the second image layer 14. For example, the materials and techniques described in the incorporated copending application are used. The geometric height of the features in the second stamper determine the difference d4–d3, and the combination of the viscosity, spinning speed and spinning time will determine the thickness d3. In a step 48, the spun-on layer 22 is cemented with adhesive layer 16 to the layer 20, thus beginning the build up toward the finished stack comprising disc 10. The laminating layer 16 is cured, either by solvent evaporation or by curing with ultra-violet light exposure, depending on the adhesive materials used. The second stamper is not detached from the layer 22 until such adhesive layer 16 is cured and free of bubbles. In a step 50, the second stamper is peeled from the layer 22. In a step 52, a fully-reflective layer, e.g., layer 24, is deposited on layer 22 with conventional techniques. In a step 54, the optical disc is finished with a protective coating and labels are applied that identify the embedded digital information and the producer source.

The method 40 describes additional steps 44, 46, 48 and 50 to make a simple two-layered compact disc. In steps 46 and 48 the invention calls for the spin coating of either a polymer solution or alternatively a monomer solution that is subsequently cured with UV radiation (photo-polymerization, or 2P process). These two alternatives are generally interchangeable, i.e. polymers can be formed first and dissolved in solutions from films after drying or monomer can be spun first and be cured with radiation. The final thin films are usually identical. The choices are strictly dictated by process designs and the general physical-chemical principles are the same. Fundamentally, the invention calls for spinning on masters as a duplication method whereas in other modes of operation (e.g. 3M's) injection of monomer liquid is employed.

The method 40 can be used also if layer 20 and layer 24 are transparent material (for example, different types of plastic). These materials must have different refractive indices from layers 18 and 22. Spin coating can be used to deposit layers 20 and 24. No metal deposition is needed. Finally, a simple repetition of steps 44, 46 and 48 will result in multilayered compact discs.

Figure 3:
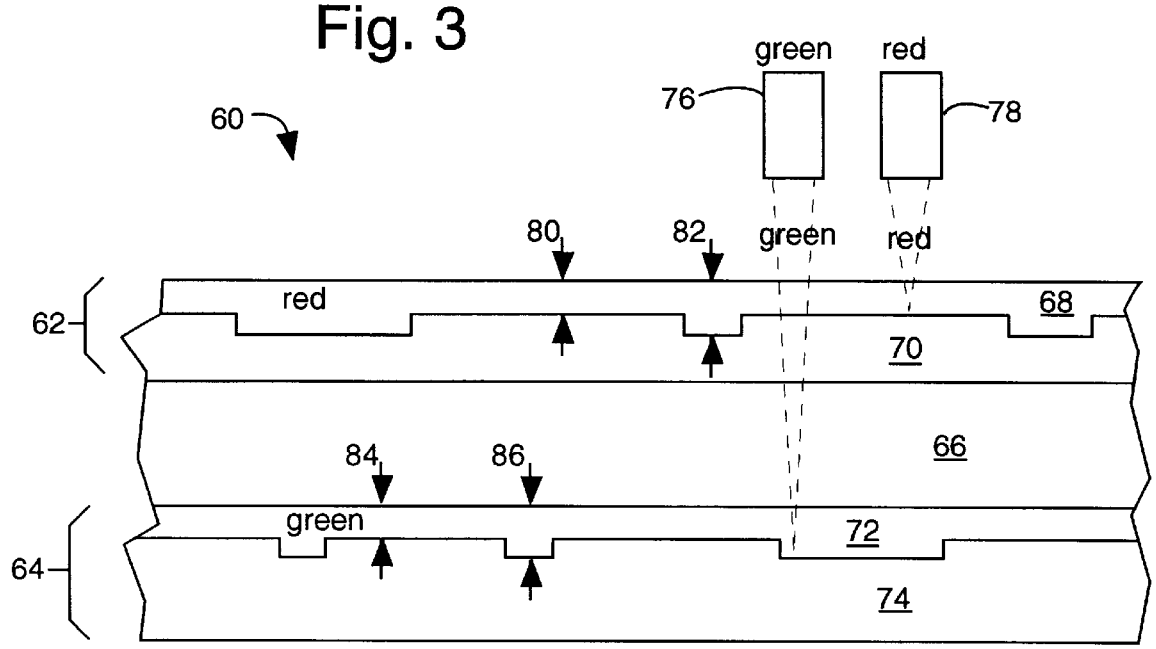
FIG. 3 is a cross-sectional diagram of a second optical disc embodiment of the present invention.

FIG. 3 illustrates an optical disc embodiment of the present invention, referred to herein by the general reference numeral 60. The optical disc 60 is similar to optical disc 10, but depends on a different phenomenon of light. Digital data is recorded in one or more image layers of the optical disc 60 using color, e.g., green and red. For example, in the two-layer version of optical disc 60 shown, a first image layer 62 in red is laminated to a second image layer 64 in green with a transparent adhesive layer 66 in between. The first image layer 62 comprises a transparent material 68 with a doping of red fluorescent dye that varies in thickness. The physical difference in thickness presents the opportunity for digital bits of data to be represented by physical relief in the first image layer 62. A partially-reflective material 70 allows green light to penetrate deeper into the optical disc 60, e.g., into the layers 66 and 64. The second image layer 64 comprises a transparent material layer 72 doped with a green fluorescent dye. Digital bits of data are represented by physical relief in the layer 72. A reflective layer 74 completes the second image layer 64.

A pair of green and red laser diodes and detectors 76 and 78, respectively, are provided that have sufficient energy output to excite the fluorescent dyes and sufficiently sensitive enough to detect the color responses. The degree to which light is reflected back to the laser diodes and detectors 76 and 78 depends on whether the light is reflecting from a pattern of lands 80 or a pattern of pits 82 in layer 62, reflecting from a pattern of lands 84 or a pattern of pits 86 in layer 64. The pits 82 return more light to the detector 78 than do the lands 80. Similarly, the pits 86 return more light to the detector 76 than do the lands 84. The laser diodes and detectors 76 and 78 may include tunable optical filters or color filters to help improve discrimination of the data detected between layers 62 and 64.

The two different colors of operation of the laser diode and detectors 76 and 78 thus permits simultaneous data access of the multiple data channels without cross-channel interference. In alternative embodiments of the present invention, more than two image layers and different color laser diode and detectors are used with corresponding color fluorescent dyes as dopants to obtain three or more overlying channels.

Figure 4:
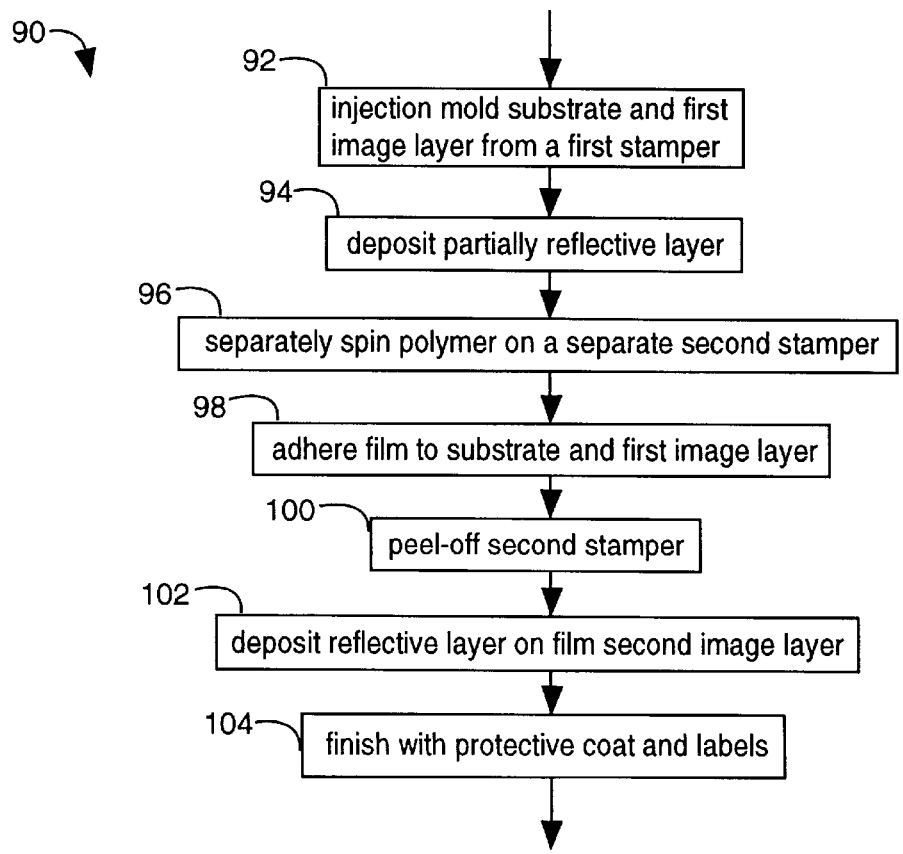
FIG. 4 is a flowchart of a second method embodiment of the present invention for making the optical disc of FIGS. 1 and 2.

FIG. 4 illustrates a method embodiment of the present invention, referred to by the general reference numeral 90. The method 90 includes a step 92 for making the first image layer and substrate, e.g., layer 68, by the conventional process of injecting a hot molten plastic into a containment cavity with a plastic stamper made of metal. Such stamper has features in relief that are patterned in plan view to represent data for the first image layer 62. Such features in relief rise a height equal to "d2" less "d1". In a step 94, a partially-reflective layer of material, e.g., layer 70 comprising aluminum, is sputtered onto layer 68 using conventional techniques. In a step 96 that uses a spin-on-and-peel process of the present invention, a polymer film is separately spun on to a separate second stamper that has features in relief that are patterned in plan view to represent data for the second image layer 64. For example, the materials and techniques described in the incorporated copending application are used. The geometric height of the features in the second stamper determine the difference in lands 80 and pits 82, and the combination of the viscosity, spinning speed and spinning time will determine the thickness. In a step 98, the spun-on layer 72 is cemented with the adhesive layer 66 to the optical disc 60, for example. The adhesive layer 66 is cured, either by solvent evaporation or by curing with ultra-violet light exposure, depending on the adhesive materials used. The second stamper is not detached from the layer 72 until such adhesive layer 66 is cured and free of bubbles. In a step 100, the second stamper is peeled from the layer 72. In a step 102, a fully-reflective layer, e.g., layer 74, is deposited on layer 72 with conventional techniques. In a step 104, the optical disc 60 is covered with a protective coating and labels are applied.

It is assumed that emitters (fluorescent dyes) are doped into layers 68 and 72 in disc 60. In another embodiment, absorbers can also be doped into layers 68 and 72. If absorbers are used then the intensities will behave in the opposite fashion, that is, a thicker area absorbs more and reflects less. It is a mater of choice in design to optimize signal detection. The available combination of materials and detectors will determine the optical arrangements and also the color of light for operations, though the type of drive and media must be compatible in any design.

Again, transparent material of different refractive indices can be used instead of metal reflective layers. Also, spin coating of plastic material will substitute metal depositions.

In an alternative embodiment of the present invention, the fluorescent dyes method can be combined with the resonance cavity concept in disc 10. The thickness of lands 80 and pits 82 can be optimized for the constructive and destructive interference of the red light and thickness of lands 84 and pits 86 can be optimized for the interferometric effect of the green laser. As is true of the present invention, various enhancement methods are not mutually exclusive and can be employed in a single design to achieve the best results.

Figure 5:
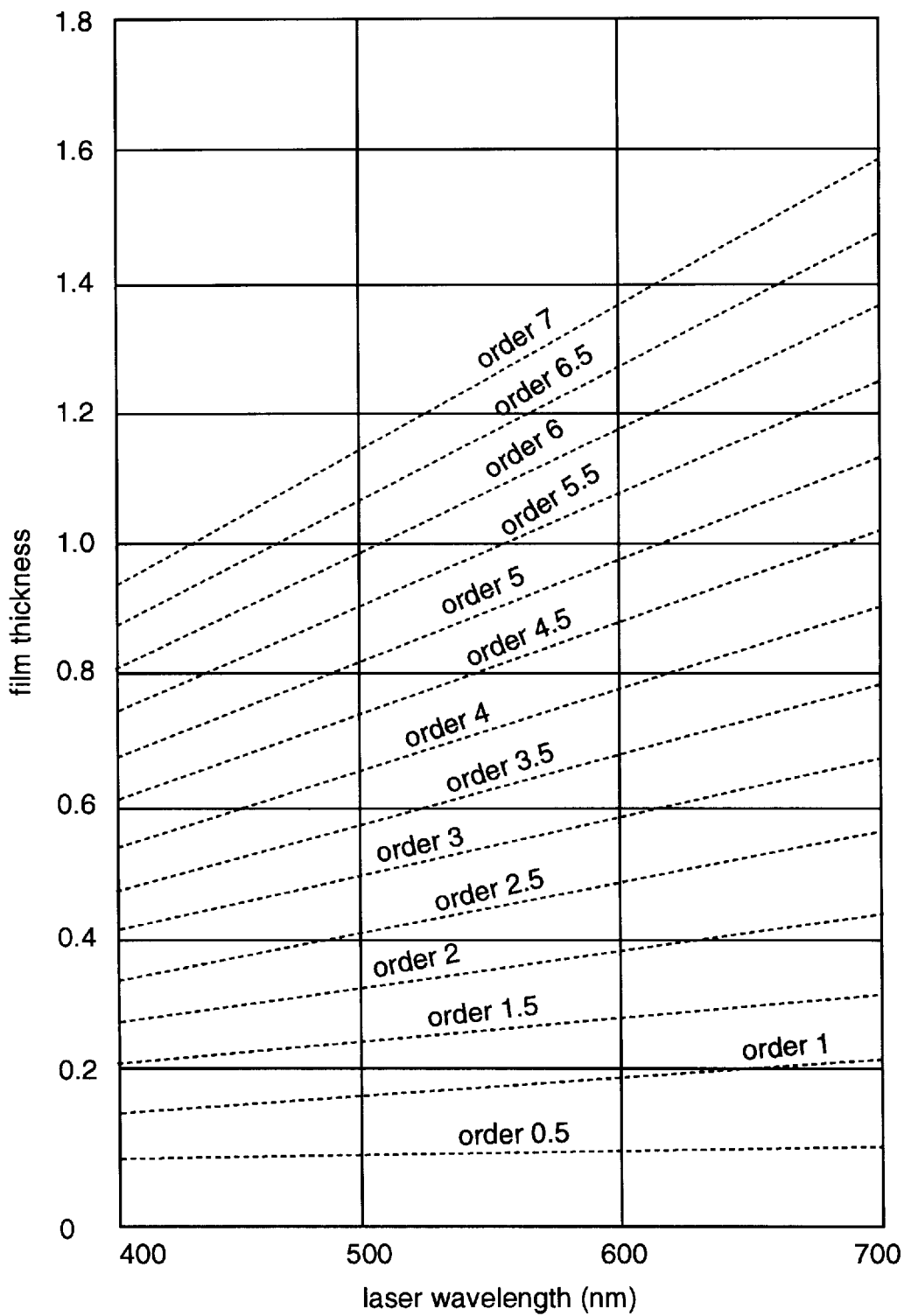
FIG. 5 is a chart of the resonance film thickness that can be used based on various laser light colors.

FIG. 5 charts the resonance film thickness that can be used with various laser light colors. The oscillatory behavior of a cosine function involved leads to resonance and anti-resonance effects. When the thickness times the index corresponds to even and odd multiples of the color of light, the transmitted light intensities reach their extremes. FIG. 5 represents the peaks and valley structure according to the order of constructive and destructive interference. For example, "order 5" represents the fifth order corresponding to constructive interference with maximum transmission and "order 4.5"represents the destructive interference with minimum transmission or maximum reflection.

Figure 6:
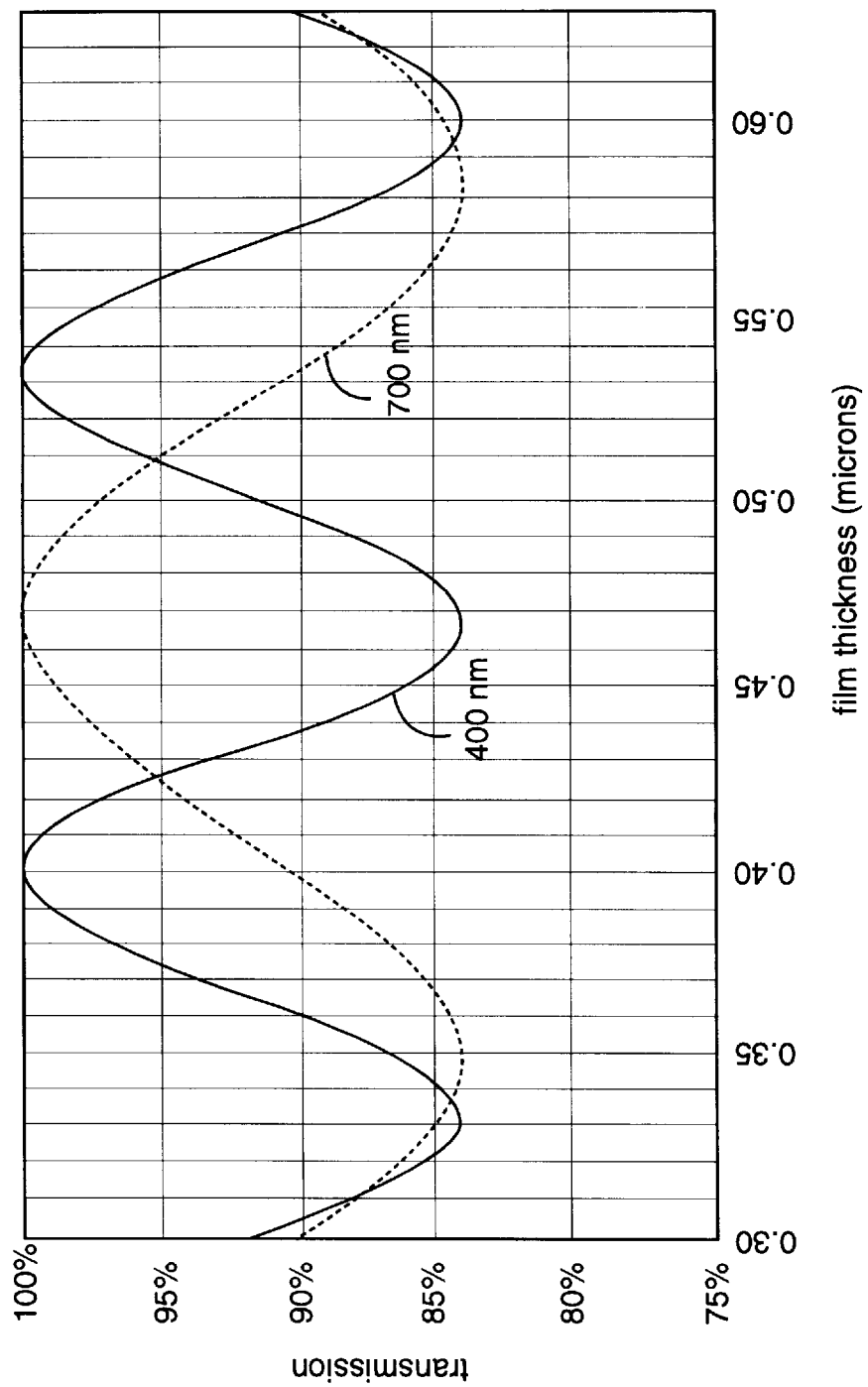
FIG. 6 is a chart plotting film thickness versus laser light transmission percentage for 400 nanometers and 700 nanometers lasers.

FIG. 6 plots film thickness versus laser light transmission percentage, e.g., for 400 nanometers and 700 nanometers lasers. At around 0.34 micron film thickness, the transmission of both 400 and 700 nanometers light is at a minimum, e.g., 84%. But 400 nanometers light reaches a maximum 100% at a film thickness of 0.41 micron. The 700 nanometers light does not reach a maximum until the film thickness is increased to 0.47 microns. A judicious selection of film thickness can result in maximum differences in transmission for one color an a minimal difference in transmission for the other color, and vice versa.

Injection molding, photopolymer and the present invention method of spin-on and peel (SOAP) duplication processes are compared in Table I.

TABLE I

| PROCESS | Injection Molding | PhotoPolymer | SOAP |
|---|---|---|---|
| High Pressure | yes | yes | no |
| Heat | yes | no | no |
| Cure | cooling | UV light | air dry |
| Solvent | no | no | yes |
| Multiple Layers | two at most | 2–10 | 2–10 |
| Thickness | very thick | 10–30 microns | 1–15 microns |
| Uniformity | 0.1 mm | one micron | 0.1 micron |
| Features | 0.8 micron | 0.4 micron | 0.1 micron |
| Density | low | high | super high |
| Resonance Cavity | no | no | yes |

A two layer compact disc that uses resonance cavities for each layer that are preferably tuned in one embodiment, provide minimum cross talk between the layers by a judicious selection of the laser light frequencies. For example, using 400 nanometers and 700 nanometers as the two laser channel frequencies, layer one cavities of 0.34 micron and 0.47 micron, and layer two cavities of 0.37 and 0.63 micron, provides the responses listed in Table II.

TABLE II

| | Film Thickness | 400 nanometers Xmit | 700 nanometers Xmit |
|---|---|---|---|
| Layer One | 0.34 micron | 85% | 85% |
| | 0.47 micron | 85% | 100% |
| Layer Two | 0.37 micron | 94% | 85% |
| | 0.63 micron | 85% | 85% |

The values of the percentage light transmission for each color of laser light are taken from the chart in FIG. 6. Layer one provides a 15% difference in light transmission for 700 nanometers laser light (85% versus 100%), and no difference in light transmission for 400 nanometers laser light (85% versus 85%). Therefore, there is zero or minimal crosstalk between layers with these choices. Similarly, layer two provides a 9% difference in light transmission for 400 nanometers laser light (94% versus 85%), and no difference in light transmission for 700 nanometers laser light (85% versus 85%). Again, there is zero or minimal crosstalk between layers with these choices. Other such advantageous combinations are also possible, especially with more laser frequency choices.

Every time use is made of polymer solutions and spin and dry to form films, monomer and UV cure can be used to form films. Every time metal deposition is used for reflection, another plastic film of different refractive index can be used to do the same thing and is applied to the pattern, relief or data side. Transparent films are used more than two and up to five layers. Metal reflection is limited to two layers. Every time emitter (fluorescent dyes) is used absorber (absorbing dyes) can be used.

Thin film may or may not resonance cavity but resonance cavity must be generally thin films. Thin film may or may not be color specific but resonance cavity has to be. This is because thin film can be anywhere in the curve (FIG. 6) but by definition, resonance cavity is made either at the peak or valley.

Generally the first layer is made thick (1.2 mm) with injection molding but the subsequent layer is made thin by spinning either polymer solution or monomer with curing. Techniques are not exclusive, i.e. one can have SOAP 2P, resonance cavity, emitters, absorbers and different focal lengths all at the same time in one complete and complicated design.

Glass with photoresist is only for mastering, whereas stampers are generally metal or plastic with relief. The thin film techniques of the present invention can be used for both, but some laminations are generally called for to gain rigidity.

For multiple layers, either many lasers with various focal lengths or one fixed focal length but movable from layer to layer exists. Different layers in media can be of the same material because detectors are distinguishable from each other (spatial resolution). For multiple layers, many lasers with the same focal length at a fixed location exist. It is necessary to have media that consists of layers that are color specific (frequency resolution). Table III charts various embodiments of the present invention.

TABLE III

| | Method or Structure | | |
|---|---|---|---|
| Replication | (1) Spin-on-and-peel method | | |
| Plastics | (1) Polymer Solution, Solvent Evaporation | (2) Monomer Liquid, Radiation Cure | |
| Media | (1) Thin Film | (2) Resonance Cavity | (3) Dopants (emitter or absorber) |
| Back Reflector | (1) Metal Reflection | (2) Plastic of a Different Index | |
| Drive, Reader | (1) Spatial Resolution, Variable Focal Length | (2) Spatial Resolution, Variable Focal Length | |
| Writing | (1) Spatial Resolution | (2) Spectral Resolution | (3) Simultaneous Spatial and Spectral Resolutions Different Focal Length and Color |

FIG. 7 is a cross-sectional diagram of a resonance-cavity compact disc for 400 nanometers lasers.

FIG. 8 is a cross-sectional diagram of a resonance-cavity compact disc for 700 nanometers lasers.

FIGS. 9A–9C illustrate a method of the present invention for writing and reading data to and from a multilayer recordable optical disc. The method is shown by the change in states of a three-layer recordable compact disc (CD-R) 100, which is a flat round disc that resembles an ordinary compact disc (CD) familiar to consumers. FIG. 9A shows CD-R 100 as a blank disc. FIG. 9B shows the CD-R 100 being written with data. FIG. 9C shows the data being read back from the CD-R 100.

The structure of the CD-R 100 is shown in FIGS. 9A–9C and comprises a transparent plastic substrate 102 that is about 0.6 millimeters thick. An image layer 104 is a thin film attached to the substrate 102 and has a protective layer 106 behind a reflective metal layer 107. The protective layer 106 can comprise UV-cured resin and include a manufacturer's logo and other identifying information, as is industry practice. The thin film image layer 104 is fabricated layer-by-layer using the spin-on-and-peel method described herein. A first recording layer 108, a second recording layer 110 and a third recording layer 112 are separated by a transparent layer 114, a partially reflective metal layer 115, another transparent layer 116, and another partially reflective layer 117. The reflective layers can be deposited by an evaporation process using metal or metal alloys that have good to excellent reflectivity, e.g., gold or aluminum. Although the three recording layers are shown on one side of the CD-R 100, it is within the scope of the present invention to include more than two recording layer on one or both sides of the CD-R 100, as is made possible by using the spin-on-and-peel method to fabricate such alternative structures. In any event, the overall thickness would typically be 1.2 millimeters, as are standard consumer CD's.

The first recording layer 108 comprises a red dye layer 118 and a clear polycarbonate layer 120. For example, organic dye materials can be used and the layers formed by the spin-on-and-peel method. It is critical that the two materials chosen for each of the three recording layers have a substantial difference in their respective coefficients of refraction, e.g., 1.6 for one and 1.4 for the other. Similarly, the second recording layer 110 comprises a yellow dye layer 122 and a clear polycarbonate layer 124. The third recording layer 112 comprises a green dye layer 126 and a clear polycarbonate layer 128. The ordering of the colors in the first through third layers is not critical. The choice of the set of colors involved is critical. The object is to have colors that are distinct in the color spectrum, e.g., fundamental colors, as opposed to secondary colors. The colors can be implemented with the use of organic dyes in the plastic base material. The chemistry of the materials used in the dye layer and clear polycarbonate layer of each of the recording layers is such that the dye layer will shrink and the clear polycarbonate layer will expand in thickness in equal and opposite amounts when the dye layer is heated by a strong enough laser of an appropriate color.

The clear polycarbonate layers 120, 124 and 128 must have pre-recording grooves that were imparted to each during a spin-on-and-peel step that was taken to fabricate each off-line on a grooved master. Each clear polycarbonate layer 120, 124 and 128 is peeled off and attached to the stack that ultimately becomes the CD-R 100. Such grooves ultimately help the data writing processes stay on track in each recording layer, as is conventional and described in more detail by E. Hamada, et al., supra.

A set of respective thickness 130, 132, and 134, of the clear polycarbonate layers 120, 124 and 128 are critical. The thickness of each of the dye layers 118, 122, and 126 is not so critical. Generally, each clear polycarbonate layer 120, 124 and 128 should be distinct in thickness from the other clear polycarbonate layers 120, 124 and 128 and have a thickness in the range shown in FIG. 6, e.g., 0.30 to 0.60 microns. This is so that the light interference phenomenon described herein can be used to advantage to encode binary digital data. The color of lasers ultimately used to read the encoded data will dictate what thickness should be used for the clear polycarbonate layers 120, 124 and 128.

FIG. 9B shows a set of relatively high-powered different-colored writing lasers 136, 138 and 140. These are labeled, for illustration only, by the colors red, yellow and green, to signify their correspondence with color dye layers 118, 122 and 126. Data is recorded in each recording layer 108, 110 and 112 by off-on operation of the three colored lasers 136, 138 and 140. It may be preferable to record the deepest layers first and only with energy sufficient to do the job, in order to prevent inadvertent writing of the adjacent recording layers. When there is a match between the color of the laser and the color of the dye layer, energy will be absorbed. Sufficient absorption will cause heating. To encode data in a recording layer, a data ZERO can be represented by not heating a spot, and a data ONE can be represented by heating a spot sufficient to cause the dye layer to shrink and the clear polycarbonate layer to expand. Or vice versa. The amount of shrinkage and expansion required is evident in FIG. 6. If the clear polycarbonate layer involved was originally 0.33 microns thick and selected to be read with a 400 nm laser, then the clear polycarbonate should expand to 0.40 microns, for example. This will cause a shift in light transmission for a binary ZERO and ONE to be from eighty-five to one hundred percent. Thus a set of thickness 142, 144 and 146 will contrast in terms of light interference effect with the thickness 130, 132 and 134, respectively. Therefore, the management of the chemistry of the plastics used in the dye layer and clear polycarbonate layers, and the duration and strength of the exposure to each of the high powered writing lasers 136, 138 and 140 will probably need to be critically balanced for each application in order to maintain the necessary relationships between the thickness 130 and 142, between 132 and 144, and between 134 and 146.

Alternative to the spectral separation just described between layers, e.g., green, yellow, red, the recording layers 108, 110 and 112 can be separated in depth enough that discrimination by optical depth of focus between the lasers 136, 138 and 140 can be used in lieu of the color separation scheme just described. In fact 136, 138 and 140 can be the same laser, moving up and down. 112, 110 and 108 will have to be separated by about thirty micrometers to avoid crosstalk among layers. This is the spatial resolution that is a simplified scheme but still requires SOAP method to produce the thin films.

FIG. 9C shows a set of relatively low-powered reading lasers 150, 152 and 154. Each includes a monochromatic light source with a different color, e.g., 1,000 nanometers (nm), 700 nm, and 400 and each includes a light amplitude detector. Each reading laser 150, 152 and 154 can be operated one at a time to access each channel of recorded data, or operated simultaneously if separated from one another to prevent crosstalk. Color filters in front of each detector can also help reduce crosstalk. Each reading laser 150, 152 and 154 respectively accesses recording layers 108, 110 and 112.

Because the relative phases of light reflected from the near and far sides of the clear polycarbonate layers 120, 124 and 128 can add or subtract from one another, the intensity of the composite reflections can vary significantly, e.g., eighty-five to one hundred percent. Where the first laser diode and detector 154 is selected to operate at a color of 400 nanometers, the intensity of light reflected from the recording layer 112 will be minimum where the transparent layer 128 is 0.37 microns thick. The intensity of light reflected from the first recording layer 112 will be maximum where the transparent layer 128 is 0.61 microns thick, e.g., where heat from the writing laser 140 caused the dye layer 126 to heat and shrink and the local heat caused the clear layer 128 to expand from 0.37 microns to 0.61 microns. Thus, the contrast of reflected light intensity will be best if thickness 134 is set to equal a transmission minimum (FIG. 6) and thickness 146 is set to equal a transmission maximum, or vice versa. It therefore is critical that the materials used in the layers 126 and 128 respectively shrink and expand appropriate to the choice of operating frequency of the reading laser 154 and the resonant cavity function represented by the curves in FIG. 6.

Similarly, where the second laser diode and detector 152 is selected to operate at a color of 700 nanometers, the intensity of light reflected from the second recording layer 110 will be minimum where the transparent layer 124 is 0.47 microns thick. The intensity of light reflected from the second recording layer 110 will be maximum where the transparent layer 124 is 0.34 microns thick. Thus the contrast of reflected light intensity will be best if the thickness 132 is set to equal a minimum and the thickness 144 is set to equal a maximum, or vice versa.

Thus the two different colors of operation of the laser diode and detectors 152 and 154 permit data access of the multiple data channels without cross-channel interference, especially if the operating points on the function curves shown in FIG. 6 are judiciously selected by choosing the thicknesses 134, 146, 132 and 144. In alternative embodiments of the present invention, more than two image layers and different color laser diode and detectors are used to obtain three or more overlying channels. For example, recording layer 108 and reading laser 150. In such case, thicknesses 130 and 142 must also be chosen well. Thus for the three recording layers 108, 110 and 112, a balance is preferably found between all three frequencies and all six thicknesses involved so that pairs of thicknesses in the same recording layer provide a substantial difference in transmissivity for the corresponding laser diode color and the other two pairs of thicknesses produce zero or very little difference in transmissivity. Such is the case for the use in two recording layers of a color of 400 nm using thicknesses of 0.37 micron and 0.61 micron, and a color of 700 nm using thicknesses of 0.47 microns and 0.34 microns.

The colors of lasers used for reading and writing the three recording layers 108, 110 and 112 and the choice of dye for each dye layer 118, 122 and 126 should be ordered. The reading and writing lasers, labeled for convenience here as "W1, R1, W2, R2, W3 and R3", are such that W1 and R1 relate to the outermost recording layer, e.g., recording layer 112 in FIGS. 9A–9C. It must be recognized that in order for W3 and R3 to reach the dye layer 118, the upper dye layers 122 and 126 must be transmissive to the W3 and R3 colors. But W2 must have a shorter color than R3 such that the dye layer 122 appears opaque to the colors of W3 and transparent to the color of R3. Similarly, it must also be recognized that in order for W2 and R2 to reach the dye layer 122, the upper dye layer 126 must be transmissive to the W2 and R2 colors. But W1 must have a shorter color than R2 such that the dye layer 126 appears opaque to the colors of W1 and transparent to the color of R2. Being opaque at a particular color is the mechanism by which a particular dye layer absorbs writing laser energy for heating. Ordinarily, an upper dye layer that is opaque to some color will block that color from reaching deeper. In an exemplary two-layer embodiment, R1=450 nm, W1=450 nm, R2=560 nm, and W2=560 nm. Therefore, the outermost dye layer should transition between opaque at 450 nm to clear at 530 nm. This allows W2 at 560 nm to pass deeper to the next deeper dye layer which should itself transition between opaque at 560 nm to clear at 750 nm.

Figure 10A:
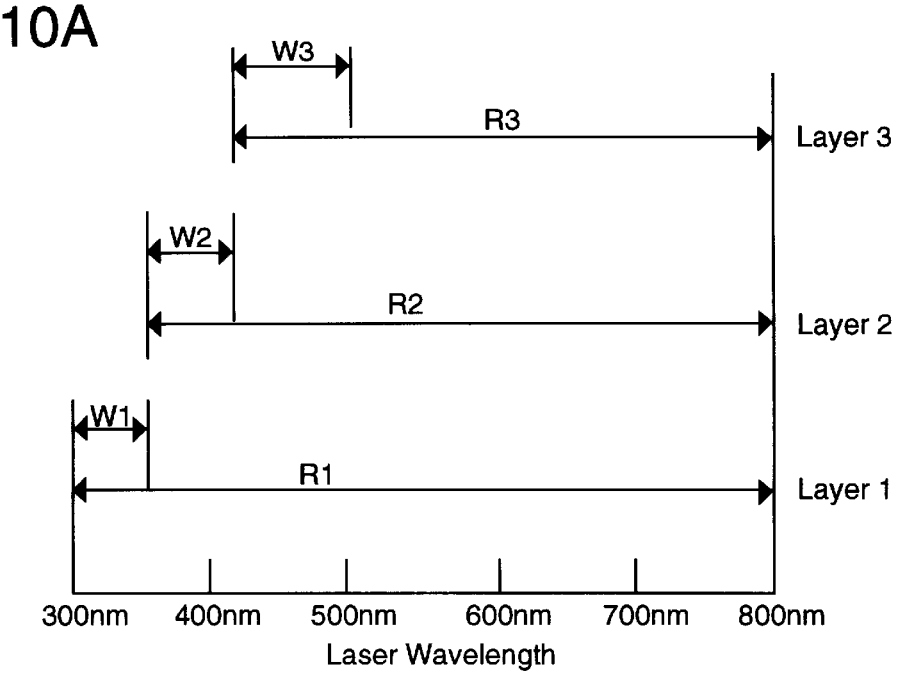
Figure 10B:
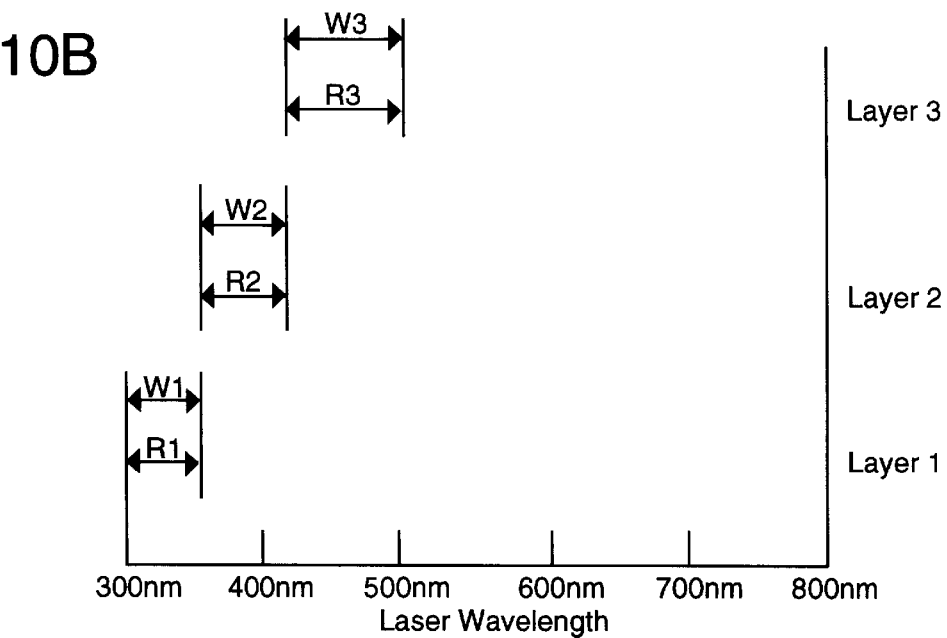

FIGS. 10A–10B illustrate the writing and reading strategy for multiple layered discs in two different schemes. A choice can be made to achieve either high performance or low cost, or both depending on the availability of lasers or economic factors. FIG. 10A would be appropriate in the case of using only the spatial resolution since the reading scheme relies on large separations among different layers and only one laser, i.e., R1=R2=R3=R and R>W3>W2>W1. In other words, one reading laser that is of longer wavelength than all the writing lasers can be used. FIG. 10B would be appropriate in the case of using spectral resolution since the reading scheme relies on difference in laser wavelengths and multiple reading lasers are needed, i.e., W1=R1<W2=R2<W3=R3. In other words, three reading lasers are needed but can be the same as the writing lasers. In more complex cases such as dye absorption with no clear cutoff in spectral response, the principle still can be applied and will serve to minimize crosstalk.

A method embodiment of the present invention for making and recording data in an optical disc comprises the steps of fabricating a clear plastic substrate 102 in the shape of a flat disk approximately 0.6–1.2 millimeters thick. Depositing a polymer solution on a pre-recording grooved master disc. Spinning the master disc with the polymer solution to form a first clear film 128 having a first near micrometer thickness. Curing the first clear film 128 to harden it. Peeling-off the first clear film 128 from the master and attaching it to the clear plastic substrate 102. Depositing a first organic color dye and plastic layer 126 over the first clear film 128, wherein the materials of the first organic color dye and plastic layer 126 and the first clear film 128 have substantially different indices of refraction. Depositing a first partially reflective metal layer over the first organic color dye and plastic layer 126. Depositing a polymer solution on a pre-recording grooved master disc. Spinning the master disc with the polymer solution to form a second clear film 124 having a second near micrometer thickness. Curing the second clear film 124 to harden it. Peeling-off the second clear film 124 from the master and attaching it to the clear plastic substrate 102. Depositing a second organic color dye and plastic layer 122 over the second clear film 124, wherein the second organic color dye color can be different from the first organic color dye, and wherein the materials of the second organic color dye and plastic layer 122 and the second clear film 124 have substantially different indices of refraction. Depositing a second partially reflective metal layer over the second organic color dye and plastic layer 122. Writing a first set of data to the first organic color dye and plastic layer 126 and the first clear film 128 by heating portions of the first organic color dye and plastic layer 126 with a laser 140 of the same color such that the heated portions of the first organic color dye and plastic layer 126 shrink in thickness and the first clear film 128 expands in thickness, wherein the transmissivity of light through the heated and not heated portions is substantially different for a first monochromatic laser light 154 due to constructive and destructive light interference effects, and wherein the first monochromatic light has a color. Writing a second set of data to the second organic color dye and plastic layer 122 and the second clear film 124 by heating portions of the second organic color dye and plastic layer 122 with a laser 138 of the same color such that the heated portions of the second organic color dye and plastic layer 122 shrink in thickness and the second clear film 124 expands in thickness, wherein the transmissivity of light through the heated and not heated portions is substantially different for a second monochromatic laser light 152 due to constructive and destructive light interference effects, and wherein the second monochromatic light has a color substantially different from the first monochromatic light. Reading the first set of data by exposing the heated and not heated portions of the first organic color dye and plastic layer 126 and the first clear film 128 with the first monochromatic laser light 154 and interpreting the constructive and destructive light interference effects as representing digital encoding of the first set of data. Reading the second set of data by exposing the heated and not heated portions of the second organic color dye and plastic layer 122 and the second clear film 124 with the second monochromatic laser light 152 and interpreting the constructive and destructive light interference effects as representing digital encoding of the second set of data. Alternatively, additional recording layers can be added and used to store data.

The methods described can be applied to plastic and glass discs in front of the laser side, and aluminum disc as a backside support. The present invention is not limited to three layers, up to five layers can be used. The interferometric method is only one of spectral resolution methods, the others are doping with fluorescent dye or absorber and spatial resolution. In the claims the word color is used as a synonym for wavelength and should not be interpreted as primary color. Currently a wide spectrum of laser wavelengths are available. Even tunable lasers that are continuous over a short range can be used. Blue is around 480 nm, green is around 570 nm, and yellow is around 620 nm. Modern optics are sophisticated enough that 620 and 630 nm can be used without problems.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An optical disc, comprising:
   a clear plastic or glass substrate in the shape of a flat disk approximately 0.6–1.2 millimeters thick;
   a first clear film with pre-recording grooves having a first micron thickness attached to the substrate;
   a first color dye and plastic layer deposited over the first clear film, wherein the materials of said first color dye and plastic layer and the first clear film have substantially different indices of refraction;
   a first partially reflective metal layer deposited over said first color dye and plastic layer;
   a second clear film with pre-recording grooves having a second submicron thickness substantially different from the first micron thickness, and deposited over the first partially reflective metal layer;
   a second color dye and plastic layer deposited over the second clear film, wherein said second color dye color is different from said first color dye, and wherein the materials of said second color dye and plastic layer and said second clear film have substantially different indices of refraction; and
   a second partially reflective metal layer deposited over said second color dye and plastic layer.

2. The product of an optical disc made by the process of:
   fabricating a clear plastic substrate or glass disc in the shape of a flat disk approximately 0.6–1.2 millimeters thick;
   depositing a polymer solution on a prerecording grooved master disc;
   spinning said master disc with said polymer solution to form a first clear film having a first micron thickness;
   curing said first clear film to harden it;
   peeling-off said first clear film from said master and attaching it to said clear plastic or glass substrate;
   depositing a first color dye and plastic layer over said first clear film, wherein the materials of said first color dye and plastic layer and said first clear film have substantially different indices of refraction;
   depositing a first partially reflective metal layer over said first color dye and plastic layer;
   depositing a polymer solution on a pre-recording grooved master disc;
   spinning said master disc with said polymer solution to form a second clear film having a second micron thickness substantially different from said first submicron thickness;
   curing said second clear film to harden it;
   peeling-off said second clear film from said master and attaching it to said clear plastic or glass substrate;
   depositing a second color dye and plastic layer over said second clear film, wherein said second color dye color is different from said first color dye, and wherein the materials of said second color dye and plastic layer and said second clear film have substantially different indices of refraction; and
   depositing a second partially reflective metal layer over said second color dye and plastic layer.

3. The product of the process of claim 2 made by the further steps of:
   writing a first set of data to said first color dye and plastic layer and said first clear film by heating portions of said first color dye and plastic layer with a laser "W1" of the same color such that said heated portions of said first color dye and plastic layer shrink in thickness and said first clear film expands in thickness, wherein the transmissivity of light through said heated and not heated portions is substantially different for a first monochromatic laser light; and
   writing a second set of data to said second color dye and plastic layer and said second clear film by heating portions of said second color dye and plastic layer with a laser "W2" of the same color such that said heated portions of said second color dye and plastic layer shrink in thickness and said second clear film expands in thickness, wherein the transmissivity of light through said heated and not heated portions is substantially different for a second monochromatic laser light, and wherein said second monochromatic light has a wavelength substantially different from said first monochromatic light.

4. The product of the process of claim 3 made by the further steps of:
   reading said first set of data by exposing said heated and not heated portions of said first color dye and plastic layer and said first clear film with said first monochromatic laser light "R1" and interpreting said intensity variation as representing digital encoding of said first set of data; and
   reading said second set of data by exposing said heated and riot heated portions of said second color dye and plastic layer and said second clear film with said second monochromatic laser light "R2" and interpreting said intensity variation as representing digital encoding of said second set of data.

5. The product of the process of claim 2, wherein:
   the steps of making the clear film includes the use of a fluorescent dye or an absorber as dopant embedded in the clear film.

6. The product of the process of claim 2, wherein:
   the steps of depositing color dye and plastic layers are such that the choice of color of said color dye depends on the depth order of each of said color dye and plastic layers.

7. The product of the process of claim 2, wherein:

the steps of depositing color dye and plastic layers are such that the choice of color of said color dye depends on the depth order of each of said color dye and plastic layers;

the steps of reading and writing are such that said reading and writing lasers, W1, R1, W2, and R2, are such that said first dye layer is transmissive to the W2 and R2 colors, and opaque to the W1 color; and the steps of reading and writing are such that said reading and writing lasers, W1, R1, W2, and R2, are such that said second dye layer is opaque to the W2 color.

8. An optical disc writing system, comprising:

a clear plastic or glass substrate in the shape of a flat disk approximately 0.6–1.2 millimeters thick;

a first clear film with pre-recording grooves having a first micron thickness attached to the substrate;

a first color dye and plastic layer deposited over the first clear film, wherein the materials of said first color dye and plastic layer and the first clear film have substantially different indices of refraction;

a first partially reflective metal layer deposited over said first color dye and plastic layer;

a second clear film with pre-recording grooves having a second micron thickness substantially different from the first micron thickness, and deposited over the first color dye and plastic layer;

a second color dye and plastic layer deposited over the second clear film, wherein said second color dye color is different from said first color dye, and wherein the materials of said second color dye and plastic layer and said second clear film have substantially different indices of refraction;

a second partially reflective metal layer deposited over said second color dye and plastic layer;

means for writing a first set of data to said first color dye and plastic layer and said first clear film by heating portions of said first color dye and plastic layer with a laser "W1" of the same color such that said heated portions of said first color dye and plastic layer shrink in thickness and said first clear film expands in thickness, wherein the transmissivity of light through said heated and not heated portions is substantially different for a first monochromatic laser light, and wherein said first monochromatic light has a submicron color; and means for writing a second set of data to said second color dye and plastic layer and said second clear film by heating portions of said second color dye and plastic layer with a laser "W2" of the same color such that said heated portions of said second color dye and plastic layer shrink in thickness and said second clear film expands in thickness, wherein the transmissivity of light through said heated and not heated portions is substantially different for a second monochromatic laser light, and wherein said second monochromatic light has a micron color substantially different from said first monochromatic light.

9. An optical disc reading system, comprising:

a clear plastic or glass substrate in the shape of a flat disk approximately 0.6–1.2 millimeters thick;

a first clear film with pre-recording grooves having a first micron thickness attached to the substrate;

a first color dye and plastic layer deposited over the first clear film, wherein the materials of said first color dye and plastic layer and the first clear film have substantially different indices of refraction;

a first partially reflective metal layer deposited over said first color dye and plastic layer;

a second clear film with pre-recording grooves having a second micron thickness substantially different from the first submicron thickness, and deposited over the first color dye and plastic layer;

a second color dye and plastic layer deposited over the second clear film, wherein said second color dye color is different from said first color dye, and wherein the materials of said second color dye and plastic layer and said second clear film have substantially different indices of refraction;

a second partially reflective metal layer deposited over said second color dye and plastic layer;

means for reading said first set of data by exposing said heated and not heated portions of said first color dye and plastic layer and said first clear film with said first monochromatic laser light "R1" and interpreting said light intensity variation as representing digital encoding of said first set of data; and means for reading said second set of data by exposing said heated and not heated portions of said second color dye and plastic layer and said second clear film with said second monochromatic laser light "R2" and interpreting said light intensity variation as representing digital encoding of said second set of data.

10. An optical disc writing and reading system, comprising:

a clear plastic or glass substrate in the shape of a flat disk approximately 0.6–1.2 millimeters thick;

a first clear film with pre-recording grooves having a first submicron thickness attached to the substrate;

a first color dye and plastic layer deposited over the first clear film, wherein the materials of said first color dye and plastic layer and the first clear film have substantially different indices of refraction;

a first partially reflective metal layer deposited over said first color dye and plastic layer;

a second clear film with pre-recording grooves having a second micron thickness substantially different from the first micron thickness, and deposited over the first color dye and plastic layer;

a second color dye and plastic layer deposited over the second clear film, wherein said second color dye color is different from said first color dye, and wherein the materials of said second color dye and plastic layer and said second clear film have substantially different indices of refraction;

a second partially reflective metal layer deposited over said second color dye and plastic layer;

means for writing a first set of data to said first color dye and plastic layer and said first clear film by heating portions of said first color dye and plastic layer with a laser "W1" of the same color such that said heated portions of said first color dye and plastic layer shrink in thickness and said first clear film expands in thickness, wherein the transmissivity of light through said heated and not heated portions is substantially different for a first monochromatic laser light, and wherein said first monochromatic light has a submicron wavelength;

means for writing a second set of data to said second color dye and plastic layer and said second clear film by heating portions of said second color dye and plastic layer with a laser "W2" of the same color such that said heated portions of said second color dye and plastic layer shrink in thickness and said second clear film expands in thickness, wherein the transmissivity of light through said heated and not heated portions is substantially different for a second monochromatic laser light, and wherein said second monochromatic light has a submicron wavelength substantially different from said first monochromatic light;

means for reading said first set of data by exposing said heated and not heated portions of said first color dye and plastic layer and said first clear film with said first monochromatic laser light "R1" and interpreting said light intensity variations as representing digital encoding of said first set of data; and means for reading said second set of data by exposing said heated and not heated portions of said second color dye and plastic layer and said second clear film with said second monochromatic laser light "R2" and interpreting said light intensity variations as representing digital encoding of said second set of data.

* * * * *